United States Patent
Huysmans

(10) Patent No.: US 7,342,677 B2
(45) Date of Patent: Mar. 11, 2008

(54) METHOD AND SYSTEM FOR ORDERING PRINTING OF A DIGITAL IMAGE VIA A HOME SERVER

(75) Inventor: Erik Huysmans, Herenthout (BE)

(73) Assignee: Agfa-Gevaert, Mortsel (BE)

( * ) Notice: Subject to any disclaimer, the term of this patent is extended or adjusted under 35 U.S.C. 154(b) by 980 days.

(21) Appl. No.: 10/365,823

(22) Filed: Feb. 13, 2003

(65) Prior Publication Data

US 2003/0151769 A1 Aug. 14, 2003

Related U.S. Application Data

(60) Provisional application No. 60/373,714, filed on Apr. 18, 2002.

(30) Foreign Application Priority Data

Feb. 13, 2002 (EP) .................................. 02100129
Feb. 13, 2002 (EP) .................................. 02100132

(51) Int. Cl.
G06K 15/00 (2006.01)
(52) U.S. Cl. ..................................... 358/1.15; 358/1.16
(58) Field of Classification Search ............... 358/1.15, 358/1.16, 468, 400, 401, 404
See application file for complete search history.

(56) References Cited

U.S. PATENT DOCUMENTS

| 6,198,526 B1 | 3/2001 | Ohtsuka |
| 6,583,799 B1 * | 6/2003 | Manolis et al. ............. 715/838 |
| 6,917,379 B1 * | 7/2005 | Ichihara ................... 348/207.1 |

FOREIGN PATENT DOCUMENTS

| EP | 0856972 | 8/1998 |
| WO | WO 0181083 | 11/2001 |

* cited by examiner

*Primary Examiner*—Jerome Grant, II
(74) *Attorney, Agent, or Firm*—Milde & Hoffberg, LLP

(57) ABSTRACT

A method for ordering printing of a digital image by a customer and a system in which the method is implemented. The system includes a home server located at a home of the customer, an originating server and a lab server, that can communicate with each other via a computer network such as the Internet. An order for a product that includes the digital image is transmitted from the originating server to the home server. The order is then automatically transmitted from the home server to the lab server for providing the product.

4 Claims, 2 Drawing Sheets

METHOD AND SYSTEM FOR ORDERING PRINTING OF A DIGITAL IMAGE VIA A HOME SERVER

This application claims the benefit of U.S. Provisional Application No. 60/373,714 filed Apr. 18, 2002 and EP application no. EP 02100132.6 filed on Feb. 13, 2002.

FIELD OF THE INVENTION

The invention relates to the field of printing images, and in particular to a system for ordering the printing of digital images via a computer network.

BACKGROUND OF THE INVENTION

To obtain prints from a roll of exposed photographic film, a customer can take his film roll to a shop that provides a service for film processing and place a print order. The film roll is then developed and prints are made, either in the shop itself, e.g. by means of a minilab, or at another location such as a large laboratory that uses whole sale finishing (WSF) equipment. The customer can then return to the shop to collect the ordered prints.

If the customer is connected to a computer network such as the Internet, he can also scan his film roll to obtain digital images and send the digital images over the computer network, together with a print order, to a site that provides a photofinishing service. The digital images may be scanned from a film roll but they may also be obtained directly by means of a digital camera. From the digital images, the ordered prints are made by means of photofinishing equipment (whole sale finishing (WSF) or minilab). Then, the prints are sent directly to the customer by regular mail, or they are sent to a local shop where the customer can collect his prints. Patent application EP-A-0 856 972 discloses a network photograph system that provides a customer with a service related to a photograph via a network such as the Internet.

If the customer is travelling, e.g. on holiday, he may send his digital images by means of some wireless Internet connection to a site providing a photofinishing service; however, this is not so convenient.

There is still a need for an improved system and method for printing digital images.

SUMMARY OF THE INVENTION

The present invention is a method for ordering printing of a digital image by a customer as claimed in independent claim 1, and a system in which the method is implemented. Preferred embodiments of the invention are set out in the dependent claims. Preferably, a method in accordance with the invention is implemented by a computer program.

A system in accordance with the invention preferably includes a home server located at a home of the customer, an originating server and a lab server, that are capable of communicating data with each other via a computer network such as the Internet.

In this document, a "server" is defined as a component in a network that is used to provide services to one or more other components in the network. In general, such services may include access to files, routing of e-mail, etc. In this document, the services relate directly or indirectly to the printing of images. A server may have an active, i.e. pushing, role, or a passive, polling role. An example of a server with an active role is a home server that sends an order to a lab server at the site of a supplier of digital image products. An example of a server with a passive role is a specific server that polls another server to check whether an order for that specific server has already arrived at the other server. A server runs on a hardware device such as a computer or another data processing system.

In this document, "transmitting" data from a first server to a second one includes the case wherein the first server has an active role and the case wherein the second server has a passive, polling role; it also includes the case wherein the data are transmitted from the first to the second server via one or more intermediate servers.

The invention involves transmitting an order for a product, wherein the product includes a print of the digital image, from an originating server to a home server located at a home of the customer. The order is then automatically transmitted from the home server to a lab server for providing the product.

In a preferred embodiment, the home server is an active server that sends the order to the lab server. The home server may be a server, located at a home of the customer, that provides household services or home services such as checking whether the refrigerator is running out of specific food products, so that these food products need to be ordered; switching on and off lights during absence of the occupant to give the impression that someone is in, so as to deceive burglars; etc.

The lab server is preferably located at the site of a supplier of digital image products; the supplier will then take care of the order and provide the ordered products. The products are sent to the customer, e.g. by regular mail, or they are made available for pick-up at a particular place.

It is preferred that the digital image that is to be printed is transmitted, preferably together with the order, from the originating server to the home server. The digital image may then be stored at the location of the home server.

A system as disclosed in our patent application EP 02 100 129.2 entitled "Method and system for defining a storefront in printing digital images", and filed on Feb. 13, 2002, may be used in combination with the present invention. The originating server is then the "client server", disclosed in EP 02 100 129.2. We also refer to this European patent application for details about the fulfillment of an order, i.e. how the ordered products are provided to the customer, and for the definition of terms such as a pick-up point.

A first advantage of the invention is that additional data may be added, preferably under control of the home server (e.g. by the home server itself or by a specific software module that gets an instruction from the home server), to the order that is transmitted from the originating server to the home server; the order including the additional data is then transmitted from the home server to the lab server. The additional data may include settings such as glossy or matte prints, a print size preferred by the customer, etc. The customer thus does not have to add all these data to his order; he may e.g. simply specify that the order should be fulfilled using a particular set of settings. The data corresponding to these settings are then automatically added to the order under control of the home server, and the order including the additional data is transmitted to the lab server. Preferably, the transmission is also done under control of the home server. Data may not only be added, but in general the order may be modified before it is transmitted to the lab server. This may be done by including instructions to the home server in the order, wherein the instructions specify how the order has to be modified. The invention as claimed involves transmitting an order from an originating server to a home server and transmitting the order from the home server to a lab server; this includes transmitting the order to the lab server after modification of the order.

Another advantage of transmitting an order via the home server, from an originating server at an arbitrary location, is that the involved digital images may be stored automatically at the location of the home server, preferably under control of the home server. If the customer would transmit the order directly from the originating server to the lab server, he would still have to store his digital images at home later in order to have them at his disposal, e.g. for image processing, or for another purpose.

Yet another advantage of the invention is that the digital image itself may be modified, preferably under control of the home server, before the modified digital image is transmitted to the lab server. If a digital image is to be modified, an appropriate instruction for the home server may be included in the order sent to the home server. An example illustrating modification of a digital image is given further below.

Preferred embodiments of a system in accordance with the invention may include features of a method—as claimed or as described above or below—in accordance with the invention.

Further advantages and embodiments of the present invention will become apparent from the following description and drawing.

BRIEF DESCRIPTION OF THE DRAWINGS

The invention is described with reference to the following drawing without the intention to limit the invention thereto, and in which.

DETAILED DESCRIPTION OF THE PREFERRED EMBODIMENTS

Figure 1:
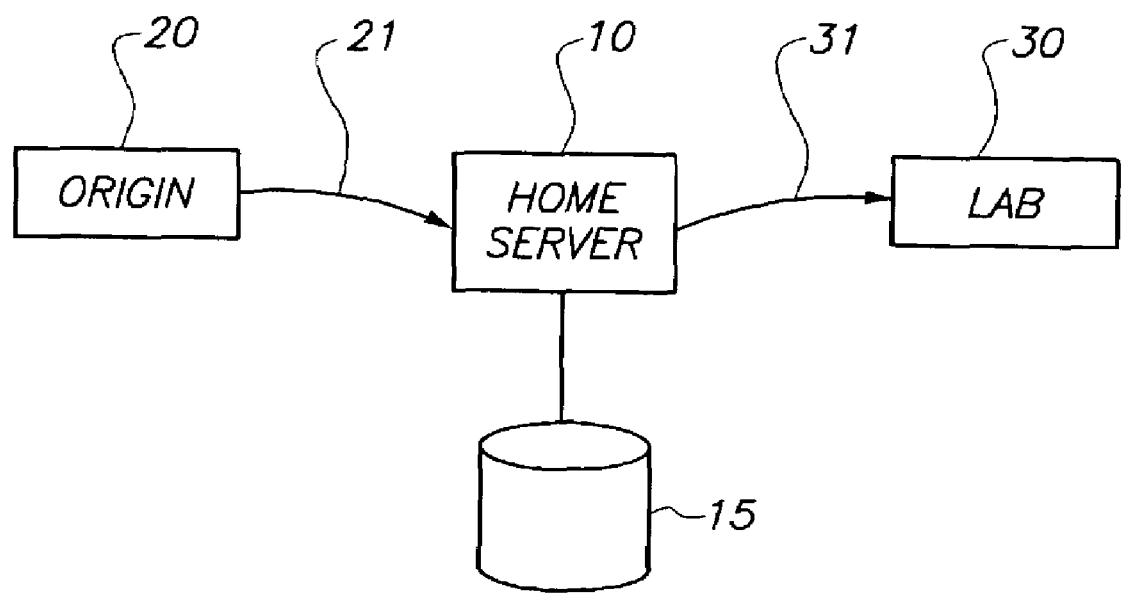
FIG. 1 shows an embodiment of a system in accordance with the invention.

FIG. 1 shows an embodiment of a system in accordance with the invention wherein an order of a customer is transmitted from an originating server 20 at an arbitrary location to a lab server 30 via a home server 10 located at a home of the customer. The originating server 20 may run on an originating device such as a mobile phone, a Personal Digital Assistant (PDA), a personal computer. The originating server 20 can communicate data with the home server 10 by a communication link 21, that may be a wireless link. The home server 10 can communicate data with a lab server 30 by a communication link 31 that may be wireless. Preferably, the hardware device on which the home server is running has or is connected to a storage medium 15, e.g. a hard disk.

A preferred embodiment of the invention is as follows. The home server 10 is implemented as a software module running on a data processing system, called "home device" in this document. A print order is received by home server 10 from originating server 20 via communication link 21. The received print order is processed under control of the home server 10. As mentioned above, the print order may be modified, e.g. by adding additional data. The print order is then sent by home server 10 via communication link 31 to lab server 30 in order to provide the product. Digital images involved in the order may be stored on storage medium 15.

The digital image may be modified, preferably under control of the home server 10, before the modified digital image is transmitted to the lab server 30. This is illustrated by the following example. The customer takes pictures by means of his digital camera, but he knows that, at least for one of the pictures, the colors of printed picture will not be to his liking—the colors will e.g. be too cold. He then specifies in the order sent to the home server 10 that one or more particular digital images must be modified before they are printed. The home server 10 interprets the received order and starts a computer program that performs an operation on the particular digital images, so as to modify their colors, in accordance with settings stored on the home device. The modified digital images are then transmitted to the lab server 30, under control of the home server 10.

An order may include one or more products. For examples of digital image products, we refer to our patent application EP 02 100 129.2, mentioned already above. The ordered products may be sent to the customer, e.g. by regular mail, or they may be made available at a pick-up point.

Another aspect of the invention is a method to control the originating server 20. It is preferred that the originating server 20 is controlled, e.g. by means of a computer program, so as to transmit an order for a product to the home server 10; this order may contain an instruction for the home server 10 effectuating that the order is automatically transmitted to lab server 30. As mentioned above, the order may be modified. The order may also contain an instruction to store digital images involved in the order at the location of the home server, or it may contain other instructions, as discussed hereinbefore.

Figure 2:
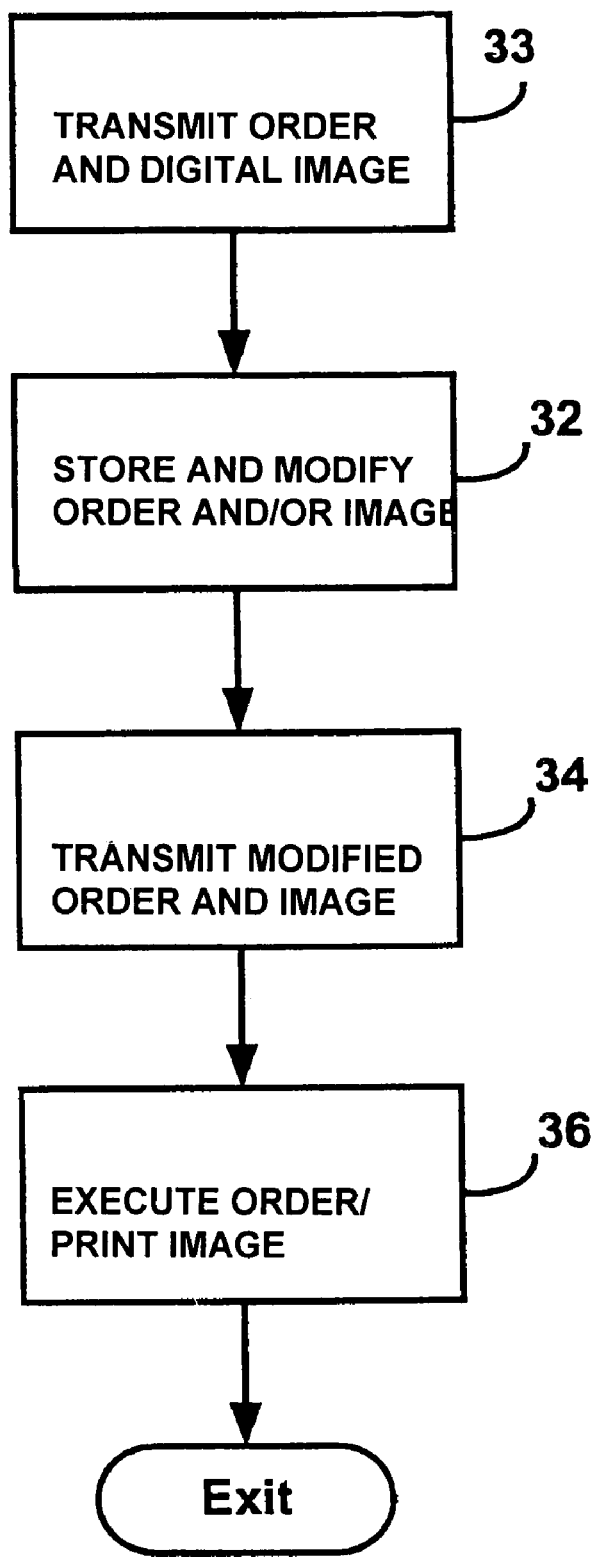
FIG. 2 is a flowchart showing the operation of the system in accordance with the invention.

FIG. 2 is a flowchart showing the sequence of steps in the operation of the present system. Initially, at step 33, after a digital image is formed by an originating server 20, a print order and the digital data defining the image are transmitted to the home server 10. Thereafter, the order and digital data are stored in the home server, at step 32, where the order and/or the image can be modified by the home server as previously prescribed by the user. Thereafter, at step 34, the print order and the digital image data, with modifications (if any), are transmitted to the lab server 30. Finally, at step 36, the print order received from the home server 10 is executed by the lab server and the images are printed.

Having described in detail preferred embodiments of the current invention, it will now be apparent to those skilled in the art that numerous modifications can be made therein without departing from the scope of the invention as defined in the appending claims.

LIST OF REFENENCE SIGNS

10: home server
15: storage means
20: originating server
21: communication
30: lab server
31: communication

The invention claimed is:

1. A method for ordering printing of a digital image by a customer, in a system wherein a home server located at a home of said customer and an originating server are capable of communicating data with each other and wherein the home server and a lab server are capable of communicating data with each other, the method comprising the steps of:
transmitting, under control of the originating server, said digital image and an order for a product from said originating server to said home server, wherein said product includes a print of said digital image;

automatically storing, in response to receipt of said order, said digital image at the location of said home server under control of said home server;

adding, under control of said home server, data defining said product to said received order;

transmitting, under control of said home server, said digital image and said order, including said added data, from said home server to said lab server; and printing said digital image at said lab server.

2. The method according to claim 1, further comprising the steps of:

performing, under control of said home server, an operation on said digital image for obtaining a modified digital image; and transmitting, under control of said home server, said modified digital image to said lab server.

3. A method for controlling operation of a home server in a system for ordering printing of a digital image by a customer, in which the system of said home server is located at a home of said customer, in which system the home server and an originating server are capable of communicating data with each other and in which system the home server and a lab server are capable of communicating data with each other, the method comprising the steps of:

receiving an order for a product from said originating server, wherein said product includes a print of said digital image;

receiving said digital image from said originating server;

automatically storing said digital image at the location of said home server;

adding, under control of said home server, data defining said product to said received order;

transmitting, under control of said home server, said digital image and said order, including said added data, to said lab server for providing said product.

4. The method according to claim 3, further comprising the steps of:

performing, under control of said home server, an operation on said digital image for obtaining a modified digital image; and transmitting, under control of said home server, said modified digital image to said lab server.

* * * * *